(12) United States Patent
Perani et al.

(10) Patent No.: US 8,044,973 B2
(45) Date of Patent: Oct. 25, 2011

(54) AUTO SORTING OF GEOMETRY BASED ON GRAPHIC STYLES

(75) Inventors: Michael Perani, San Rafael, CA (US); Scott Morrison, Portland, OR (US); Yan E. Schober, San Francisco, CA (US)

(73) Assignee: Autodesk, Inc., San Rafael, CA (US)

( * ) Notice: Subject to any disclaimer, the term of this patent is extended or adjusted under 35 U.S.C. 154(b) by 868 days.

(21) Appl. No.: 12/016,790

(22) Filed: Jan. 18, 2008

(65) Prior Publication Data

US 2009/0184973 A1 Jul. 23, 2009

(51) Int. Cl.
*G09G 5/00* (2006.01)
*G06F 17/50* (2006.01)

(52) U.S. Cl. .............................. 345/619; 345/629; 703/1

(58) Field of Classification Search .................. 345/619, 345/629; 703/1
See application file for complete search history.

(56) References Cited

U.S. PATENT DOCUMENTS

| 5,522,018 | A  | * | 5/1996 | Takeda et al. ................. | 345/422 |
| 5,815,154 | A  | * | 9/1998 | Hirschtick et al. ............ | 715/853 |
| 5,850,223 | A  | * | 12/1998 | Fujita et al. ................... | 345/420 |
| 5,864,342 | A  | * | 1/1999 | Kajiya et al. .................. | 345/418 |
| 5,926,184 | A  | * | 7/1999 | Shimizu ........................ | 345/422 |
| 6,292,194 | B1 | * | 9/2001 | Powell, III ..................... | 345/582 |
| 6,326,964 | B1 | * | 12/2001 | Snyder et al. .................. | 345/419 |
| 6,466,239 | B2 | * | 10/2002 | Ishikawa ....................... | 715/850 |
| 7,030,887 | B2 | * | 4/2006 | Andrews ....................... | 345/592 |
| 7,099,803 | B1 | * | 8/2006 | Rappoport et al. ............. | 703/1 |
| 7,142,207 | B2 | * | 11/2006 | Kamiwada et al. ........... | 345/419 |
| 7,616,219 | B2 | * | 11/2009 | Foster et al. ................... | 345/622 |
| 7,714,865 | B2 | * | 5/2010 | Faggion ........................ | 345/441 |

* cited by examiner

*Primary Examiner* — M Good Johnson
(74) *Attorney, Agent, or Firm* — Patterson & Sheridan, LLP (57) ABSTRACT

Embodiments of the invention provide an auto layer sorting feature for a computer aided drawing (CAD) application where drawing elements are sorted into different drawing layers based on the graphic style associated with each individual drawing element. Objects added to the drawing may be automatically associated with a layer such that all objects on the layer have the same graphic style. If the user changes the properties of a given graphics style associated with one of the auto-sort layers, the updated style may be applied to each objects on that layer.

18 Claims, 5 Drawing Sheets

AUTO SORTING OF GEOMETRY BASED ON GRAPHIC STYLES

BACKGROUND OF THE INVENTION

1. Field of the Invention

The present invention generally relates to computer software. More specifically, the present invention relates to a graphics application configured to sort geometry objects within a computer aided design (CAD) drawing based on graphic styles.

2. Description of the Related Art

The term computer aided design (CAD) refers to a broad variety of computer-based tools used by architects, engineers, animators, video game designers, and other graphics and design professionals. CAD applications may be used to construct computer models or drawings representing virtually any imaginable construct. One type of CAD application is a graphics application that can be used to add colors to a line drawing to compose a visually-pleasing scene or image. Photo/video editing software tools provide similar features.

Additionally, graphics applications frequently provide users with the ability to apply graphic styles to elements of the drawing. A graphic style is a set of reusable appearance attributes. Graphic styles allow a user to quickly change the look and feel of an object. For example, a user can change an object's fill and stroke color, alter its transparency, and apply various effects in one step. An example of a graphic style includes a "polka dot" graphic style, such that applying the polka dot graphic style to an object fills the object with a polka dot pattern.

Another common feature of graphics applications is the ability to organize objects on layers. Layers may be stacked one on top of another so that objects in a lower layer appear to be beneath objects in a higher layer. Layers allow designers to mimic traditional drafting and printing techniques based on film and paper, such as cutting and pasting. Designers may edit a particular layer without affecting the other layers. Most commonly, designers manually place objects into a particular layer. In some graphics applications, one layer may be a "current layer" and new objects are placed onto the current layer by the graphics application without explicit command from the user.

In some graphics applications, a user may modify the objects in a layer by changing parameters associated with that layer. For example, if five objects are placed on Layer A, and the user applies a green color to Layer A, the green color is applied to all five objects in Layer A. Other parameters of layers may be modified, including stroke thickness, transparency, blur, and other graphic style parameters, to name but a few examples. Also, one prior art technique for updating the graphic style of multiple objects is to allow a user to change one object at a time, one after another. However, individually applying a desired color or graphical style to many objects rapidly becomes tedious for the user. Especially where many objects are to be updated with the same color or graphical style.

Accordingly, there remains a need in the art for a technique for automatically sorting objects in a graphics drawing based on graphic styles.

SUMMARY OF THE INVENTION

One embodiment of the invention provides a method for sorting drawing objects in a CAD drawing in one or more drawing layers. The method may generally include receiving user input defining a drawing object to add to the CAD drawing, identifying a graphic style associated with the drawing object, and determining whether the CAD drawing includes a drawing layer that is associated with the graphic style of the drawing object. Upon determining if the CAD drawing includes a drawing layer associated with the graphic style of the drawing object, the drawing object may be associated with that drawing layer. Otherwise, upon determining the CAD drawing does not include a drawing layer associated with the graphic style of the drawing object, a new drawing layer may be created to associate with the graphic style of the drawing object, and the drawing object is then associated with the new drawing layer.

Further, once created, if the user modifies the graphic style associated with the drawing layer, then the modified graphic style may be applied to each drawing object associated with the drawing layer. The graphic style may be a color of the drawing object. The graphic style may also include a variety of parameters, e.g., a line-stroke weight, a line overshoot, a fill-color, a fill pattern, a stroke hardness, a stroke darkness, an object transparency, an object texture, or other parameters used to specify the appearance of the drawing element to which the graphic style is applied.

Advantageously, when the auto layer sort tools are activated, objects created in the graphics application are automatically associated with a layer such that all objects on the layer have the same graphic style. If the user changes the properties of a given graphics style, the updated style may be applied to all objects on that layer. Thus, rather then hunting down different objects manually, the user may efficiently and conveniently manage graphic styles in a CAD drawing. Further, if the object being created has a graphic style that does not match an already existing layer, then a new layer is created and the object is placed on the new layer. Further still, a graphical user interface may allow the user to specify which graphic styles should be auto-sorted into layers, as well as override individual objects from being auto-sorted or override individual objects from being updated when the style associated with a given drawing layer is updated.

DETAILED DESCRIPTION OF THE PREFERRED EMBODIMENTS

Embodiments of the invention provide a graphics application that includes an auto layer sort tool configured to sort drawing elements into layers, based on the graphic styles associated with each individual drawing element added to a CAD drawing. When the auto layer sort tools are activated, objects created in the graphics application are automatically associated with a layer such that all objects on the layer have the same graphic style. If the object being created has a graphic style that does not match an already existing layer, then a new layer is created and the object is placed on the new layer.

Figure 1:
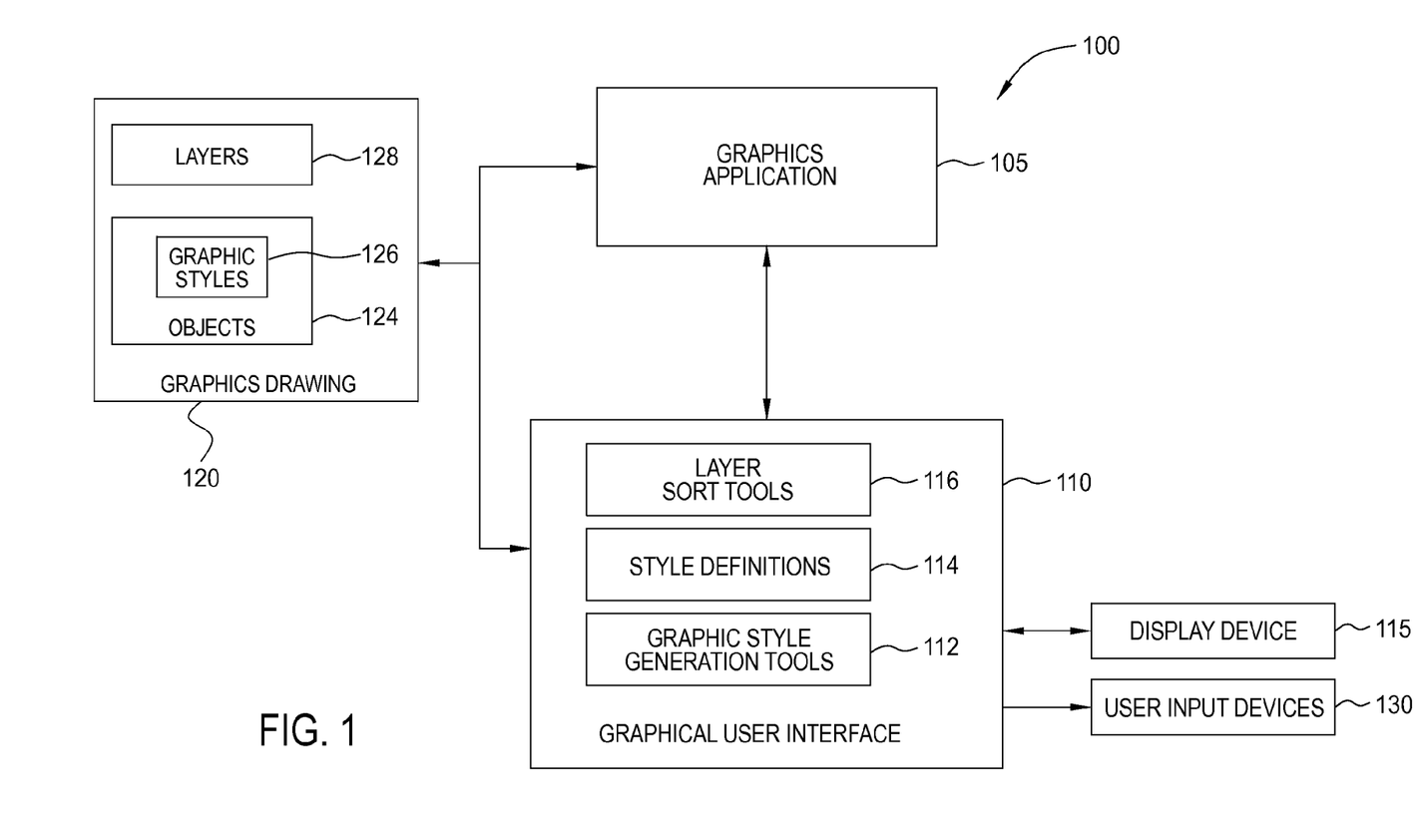
FIG. 1 is a block diagram illustrating components of a graphics application configured to sort drawing elements into different layers based on graphic styles, according to one embodiment of the invention.

FIG. 1 is a block diagram illustrating components of a graphics application configured to sort drawing elements into different layers based on graphic styles, according to one embodiment of the invention. The components illustrated FIG. 1 may include computer software applications executing on existing computer systems, e.g., desktop computers, server computers, laptop computers, tablet computers, video game consoles, and the like. The software applications described herein, however, are not limited to any particular computing system and may be adapted to take advantage of new computing systems as they become available.

Additionally, the components illustrated in FIG. 1 may be implemented as software applications that execute on a single computer system or on distributed systems communicating over computer networks such as local area networks or large, wide area networks, such as the Internet. For example, a graphical user interface 110 may include a software program executing on a client computer system at one physical location communicating with graphics application 105 at another physical location. Also, in one embodiment, graphics application 105 and graphical user interface 110 may be provided as an application program (or programs) stored on computer readable media such as a CD-ROM, DVD-ROM, flash memory module, or other tangible storage media.

As shown, a system 100 includes, without limitation, graphics application 105, graphical user interface 110, graphics drawing 120, user input devices 130, and a display device 115. Those skilled in the art will recognize, however, that the components shown in FIG. 1 are simplified to highlight aspects of the present invention and that a typical graphics application 105 and GUI interface 110 may include a broad variety of additional tools and features used to compose and manage a design or drawing. Graphics application 105 may be configured to allow users interacting with GUI interface 110 to compose graphical designs or drawings. Accordingly, graphics application 105 and GUI interface 110 may include programmed routines or instructions allowing users to create, edit, load, and save a graphics drawing 120. User input devices 130 may include a mouse pointing device, a keyboard, a joystick or a video game controller and display device 115 may be a CRT or LCD display.

Also as shown, the graphics drawing 120 includes objects 124 and layers 128. Each object 124 in the graphics drawing 120 is associated with a graphic style 126. Generally, a user may compose (or load) a graphics drawing 120 using graphics application 105. The graphics drawing 120 may include a plurality of objects 124, each associated with a graphic style 126. Each object may include a set of drawing geometry, such as points, arcs, lines, curves, etc representing the shape of a given object 124 in the graphics drawing 120. The objects 124 may be organized in layers 128. That is, each object 124 may be associated with one of the layers 128. In one embodiment, layers 128 control a draw order. Layers may be stacked one on top of another so that objects in a lower layer are drawn to appear beneath objects in a higher layer. The draw order is important when one of the objects 124 overlaps other one of the objects 124. Often, a user may change the draw order of layers using a drag-and-drop technique to modify the order of layers 128.

Graphical user interface 110 provides tools used to manipulate graphics drawing 120 using graphics application 105. As shown in FIG. 1, graphical user interface 110 may include a graphic style generation tools 112, style definitions 114, and layer sort tools 116. Those skilled in the art will recognize, however, that the tools of GUI interface 110 shown in FIG. 1 are simplified to highlight aspects of the present invention and that a typical graphics application 105 and GUI interface 110 may include a broad variety of additional tools and features used to compose and manipulate graphics drawings 120.

Graphic style generation tools 112 may provide graphical user interface elements that allow a user to create custom graphic styles. The graphic style generation tools 112 may allow the user to define and modify physical, display, and meta properties of a graphic style to be generated and stored in graphics drawing 120. The physical, display, and meta properties of graphic styles are generally referred to herein as style parameters. Examples of style parameters may include stroke weight, overshoot, spacing, paper type, hardness, darkness, angle, arc, transparency, texture, color, or any other parameters used to control the physical, display, or meta properties of a drawing element to which a given style is applied. Various graphic styles may be listed in a style definitions dialog 114. The user of the graphics application 105 may then select a graphic style from the list to apply the graphic style to an object.

In one embodiment, layer sort tools 116 may be used to sort the objects 124 into layers 128 based on the graphic style associated with each given object 124. Layer sort tools 116 allow users to create and edit graphics drawing 120, while still maintaining an organized layer structure that simplifies future edits. Further, objects with the same graphic style may automatically be grouped together on the same layer as the user composes the graphics drawing 120. For example, if a user creates multiple objects with graphic style "A", then all objects created with style "A" are associated with the same layer, e.g., a layer labeled "Auto 1". If the user later wants to assign a different graphic style to the objects in the layer "Auto 1," then the user may simply assign the new graphic style to this layer, and the appearance of each object is updated. Similarly, if a new object is created with the graphic style "A", then CAD application 105 may associate the new object with the layer "Auto 1" without requiring any user intervention.

Figure 2:
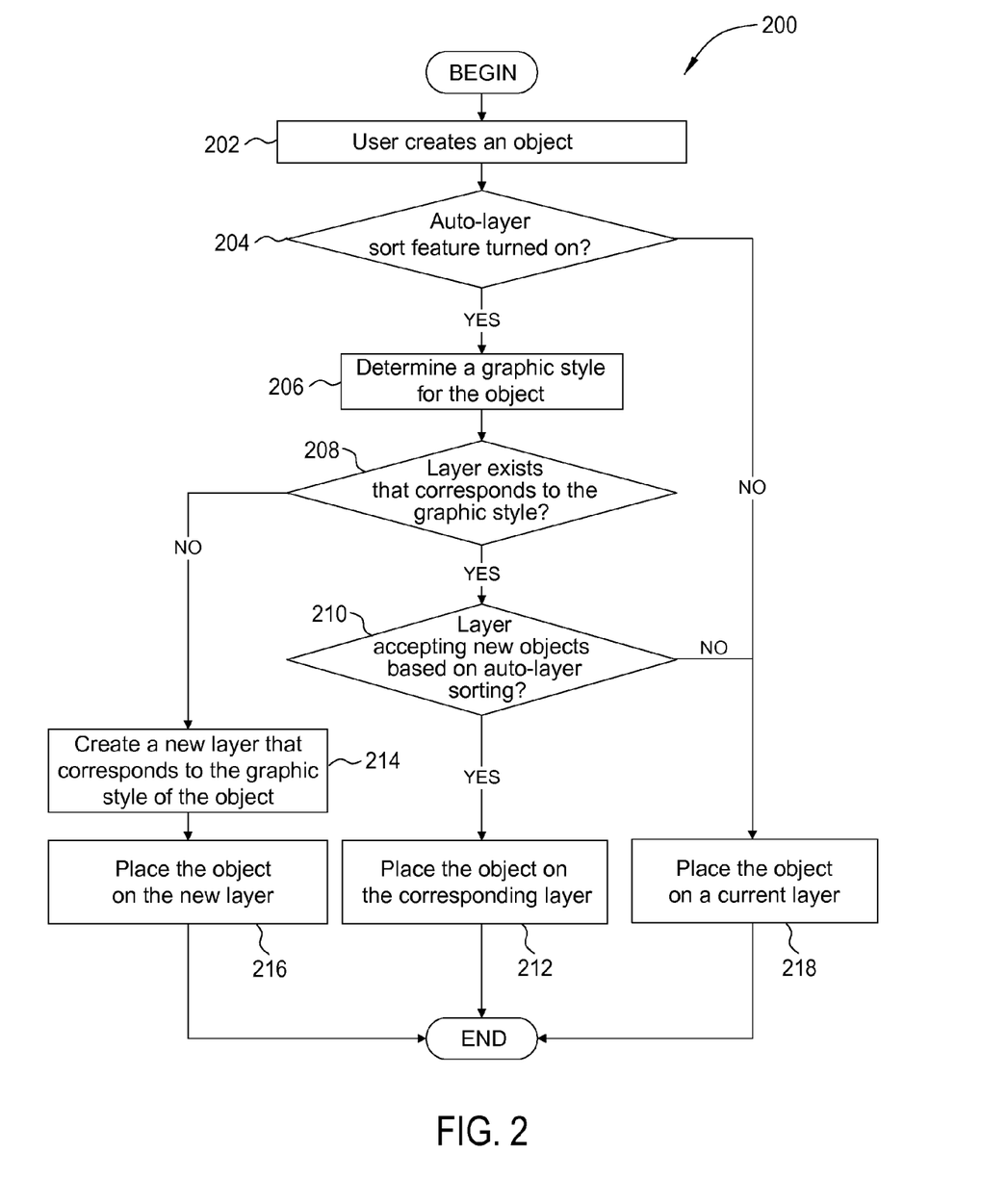
FIG. 2 is a flow chart illustrating a method for auto sorting drawing elements based on graphic styles, according to one embodiment of the invention.

FIG. 2 is a flow chart illustrating a method 200 for auto sorting drawing geometry into different layers based on graphic styles, according to one embodiment of the invention. Persons skilled in the art will understand that even though the method is described in conjunction with the systems of FIG. 1, any system configured to perform the steps of the method illustrated in FIG. 2, in any order, is within the scope of the present invention.

As shown, the method 200 begins at step 202, where the user creates a new drawing element e.g. one or more points, lines, curves, or other shapes. In one embodiment, each object in the graphics drawing, including the newly created object, may be associated with a graphic style. As stated, the graphic style defines the physical, display, and meta properties associated with the object.

At step 204, the graphics application determines if an auto-layer sort feature is activated. Generally, a layer in the graphics drawing is considered the current layer or active layer. If auto-layer sorting is not activated, then at step 218, the graphics application places the object on the current layer. If, however, auto-layer sorting is activated, then at step 206, the graphics application determines a graphic style associated with the object created at step 202.

At step 208, the graphics application determines if a layer exists that matches the graphic style of associated with the object created at step 202. As discussed above, each graphics object may be associated with a particular graphic style. At step 214, if no such layer exists, then at step 214, the graphics application creates a new layer to correspond with the graphic style associated with the graphic style determined at step 206. At step 216, the graphics application associates the object with the layer created at step 214. Otherwise, at step 208, if the graphics application determines that a layer does exist that corresponds to the graphics style, then at step 210, the graphics application determines if the layer is accepting new objects based on auto-layer sorting. That is, the graphics application determines whether the auto sorting feature has been enabled. If the auto sorting feature is not enabled, then at step 218, the graphics application places the object onto the current layer. If, at step 210, the auto sorting feature has been enabled, then, at step 212, the graphics application associates the object with the corresponding layer for the graphic style.

Accordingly, the method 200 provides for auto-layer sorting based on graphic styles. The method 200, however, is just one embodiment of a method for performing auto-layer sorting and, therefore, should not be considered limiting of the scope of the invention, which may be characterized by other equally effective embodiments. For example, even when auto-layer sorting is activated, objects may never change layers by auto-sorting after the objects are placed on a layer. This may be desired in order to maintain a user-defined layer organization that is not based on graphic style. Furthermore, there may be only one auto-layer for each graphic style. If multiple layers existed for the same graphic style, then the graphics application would not be able to determine to which layer new objects with the graphic style should be added. Nevertheless, even when an auto-layer for a graphic style exists, for example, Layer X, objects with the same graphic style as that associated with Layer X may still exist on other layers. This feature allows for users to create customized layers that are not strictly based on graphic style. Also, typically, all objects in an auto-layer receive the same graphic style. But, a user may create an exception and override an object's graphic style with a different graphic style. The updated object may remain on the same layer, but with a different graphic style than the other objects on the layer. New objects created with the graphic style of the layer may still be automatically placed onto the layer, even though there is an object on the layer with a style override.

Figure 3:
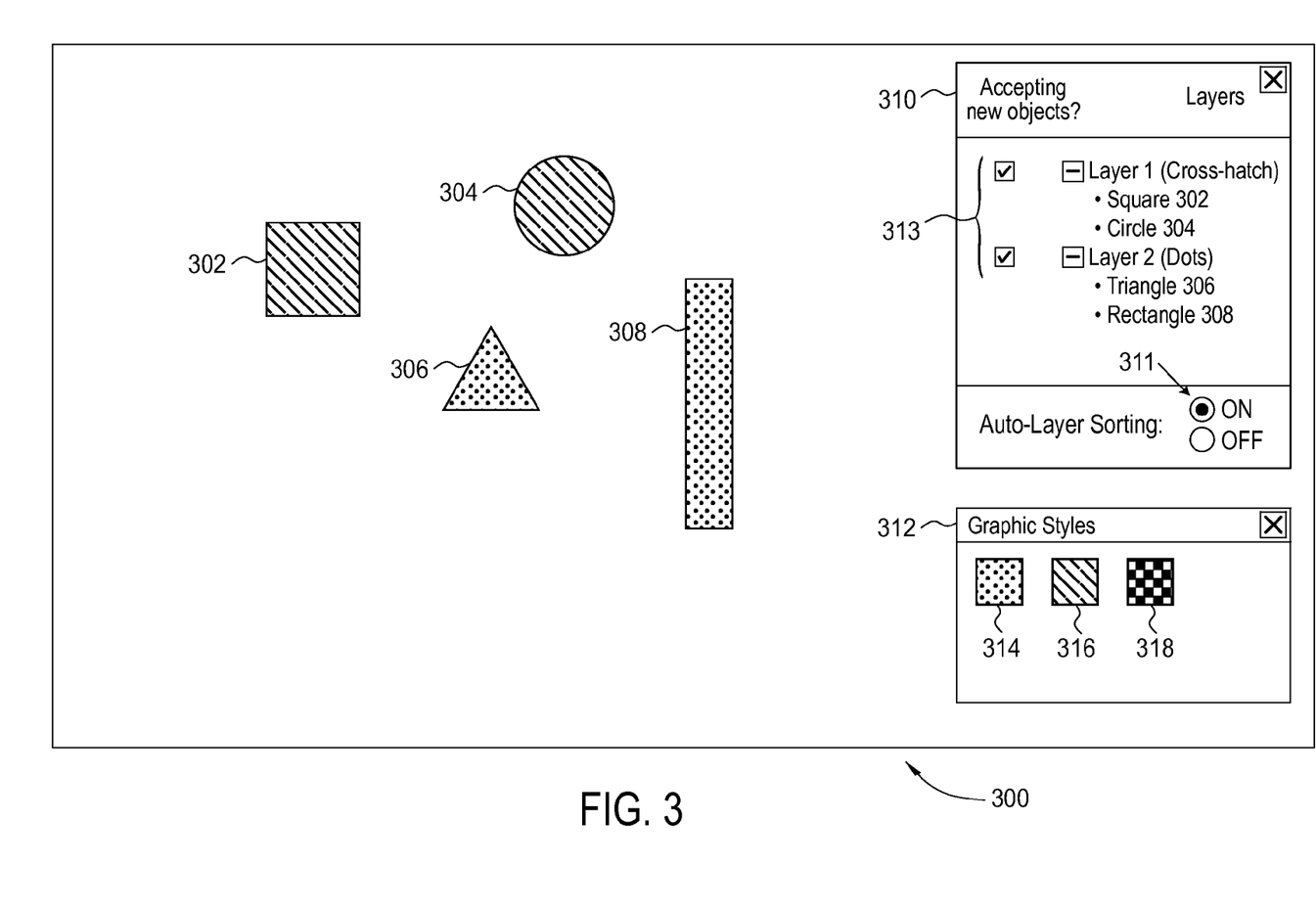
FIG. 3 is a screen shot illustrating a graphics application configured to sort drawing elements into different layers based on graphic styles, according to one embodiment of the invention.

FIG. 3 is a screen shot illustrating a graphics application configured to sort drawing elements into different layers based on graphic styles, according to one embodiment of the invention. Illustratively, a screen display 300 includes objects 302, 304, 306, 308, a layer dialog 310, and a graphic style dialog 312. The dialogs 310, 312 are exemplary dialogs for illustrating auto-layer sorting, and the graphics application may be configured with other dialogs for other features of the graphics application. As shown, the graphic style dialog 312 may include a list of graphic styles that may be applied to objects, including graphic styles for polka dots 314, cross-hatch 316, or checkers 318. Other graphic styles may include parameters that modify the physical, display, and meta properties of objects, including stroke weight, overshoot, spacing, paper type, hardness, darkness, angle, arc, transparency, texture, color, etc.

As shown, square 302 and circle 304 are associated with the cross-hatch graphic style 316, and triangle 306 and rectangle 308 are associated with the polka dot graphic style 314.

As shown in the layer dialog 310, square 302 and circle 304 are associated with Layer 1 and triangle 306 and rectangle 308 are associated with Layer 2. In one embodiment, the layer dialog 310 may include a list of each layer associated with a different graphics style.

Additionally, a radio button 311 included in the layer dialog 310 may be used to enable/disable the auto-layer sorting feature. Similarly, when the auto-layer feature is enabled, check-boxes 313 may be used to specify whether to sort objects to a particular layer (e.g., the cross-hatch layer). Thus, where radio button 311 may be used to enable/disable the auto-layer sorting feature globally, the check-boxes 313 may provide the user with more granularity over what objects are "auto-sorted" based on different graphic styles.

Figure 4:
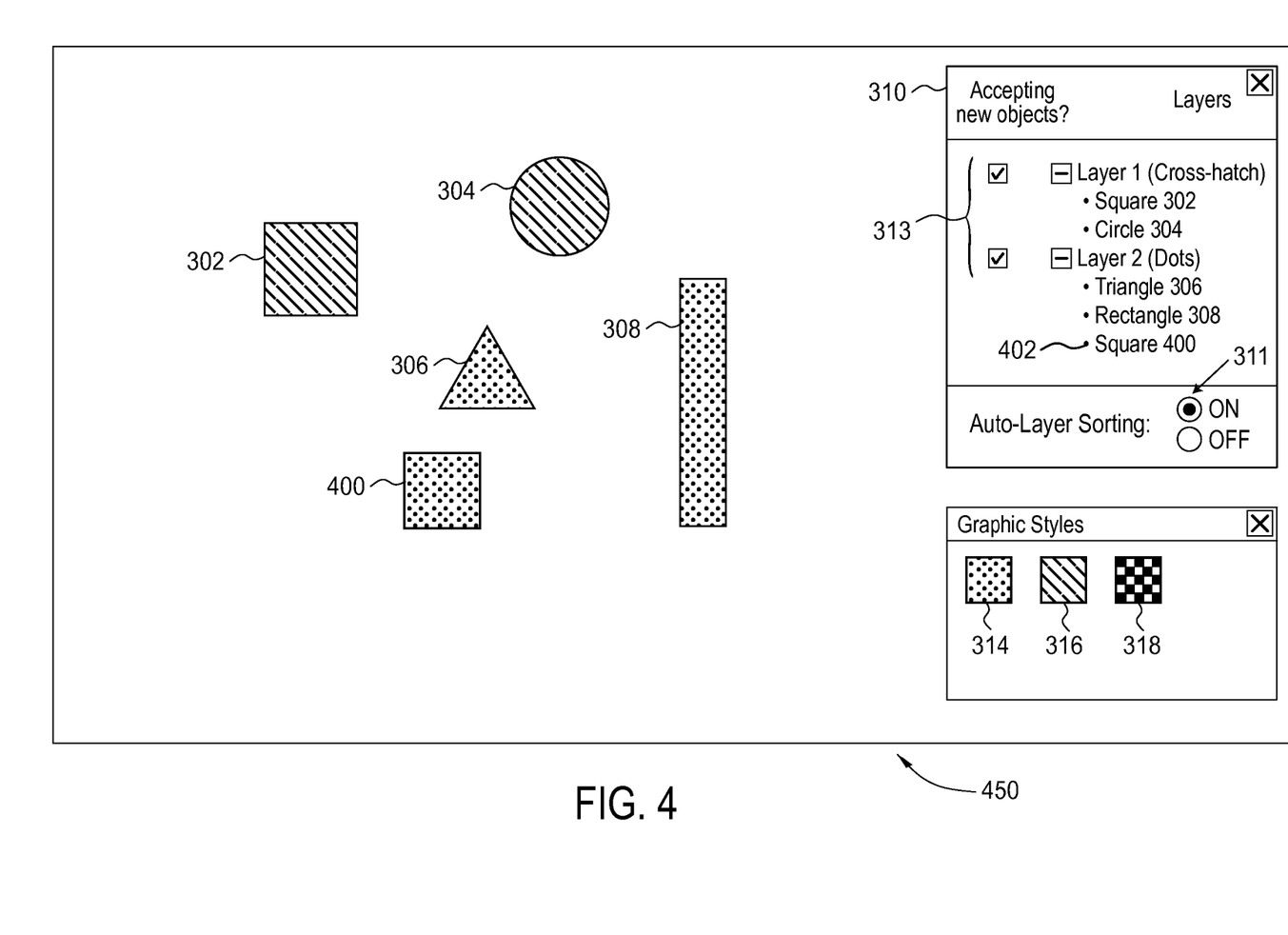
FIG. 4 is another screen shot illustrating a graphics application configured to sort drawing elements into different layers based on graphic styles, according to one embodiment of the invention.

FIG. 4 is another screen shot illustrating a graphics application configured to sort drawing elements into different layers based on graphic styles, according to one embodiment of the invention. As shown, screen display 450 builds on the screen display 300 illustrated in FIG. 3. Specifically, FIG. 4, illustrates screen display 450 after the user has created a square 400 associated with the polka dot graphic style 314 and placed the square 400 in the graphics drawing. As shown in the layer dialog 310, auto-layer sorting is enabled, as indicated by the radio button 311 set to "ON." Thus, when square 400 is created, the graphics application determines a graphic style associated with square 400. The graphic application determines that square 400 is associated with a polka dot graphic style 314. The graphics application also determines if a layer exists that corresponds to the polka dot graphic style 314. In this example, Layer 2 is determined to be an auto-sort layer associated with the polka dot graphics style 314. Then, in one embodiment, the graphics application determines if Layer 2 is accepting new objects. In this example, check-box 311 is checked indicating that Layer 2 is accepting new objects. Finally, the graphics application places square 400 on Layer 2, as indicated by the listing entry 402 of this object in dialog box 310.

Figure 5:
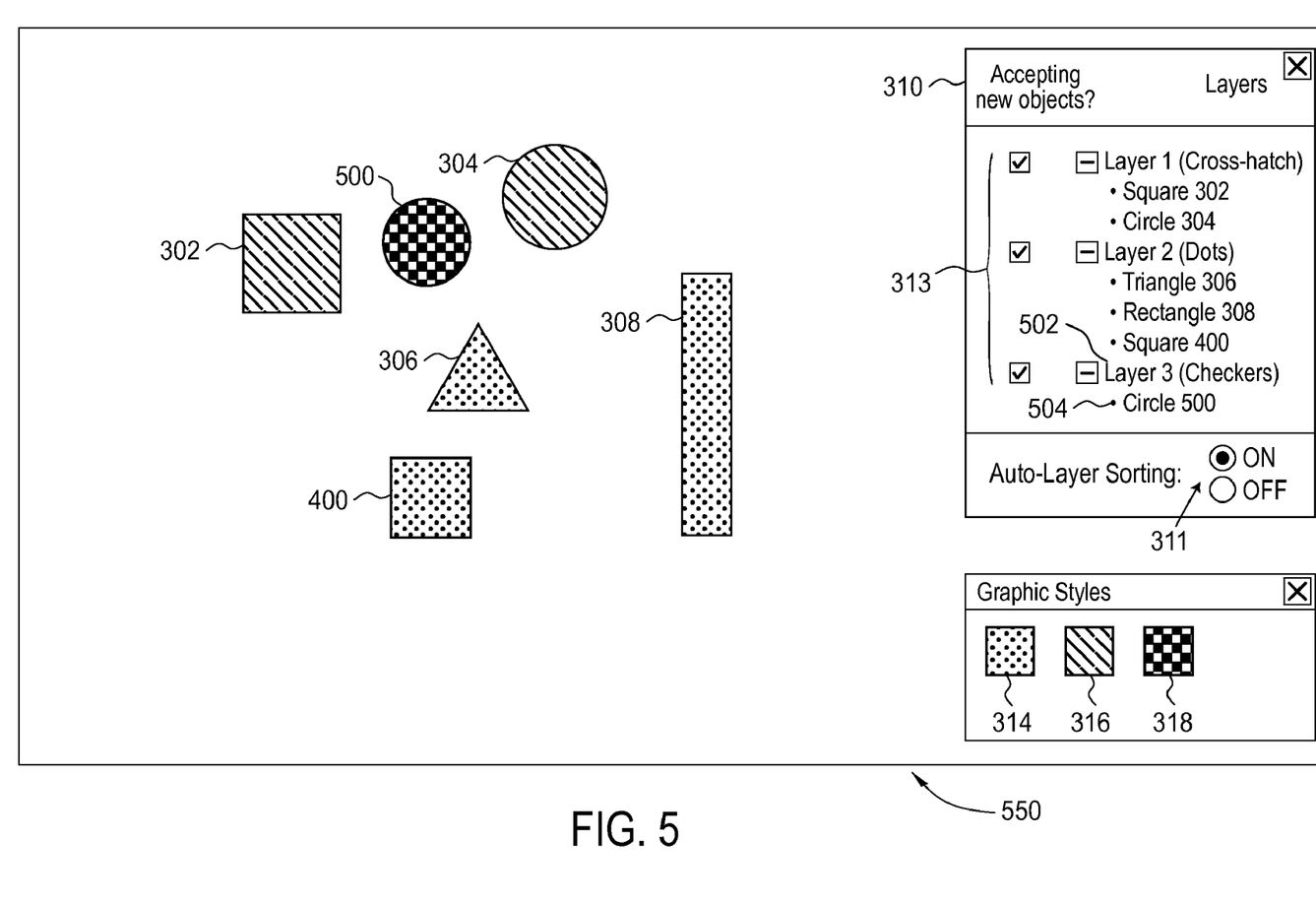
FIG. 5 is another screen shot illustrating a graphics application configured to sort drawing elements into different layers based on graphic styles, according to one embodiment of the invention.

FIG. 5 is another screen shot illustrating a graphics application configured to sort drawing elements into different layers based on graphic styles, according to one embodiment of the invention. The screen display 550 of FIG. 5 builds on the screen display 450 illustrated in FIG. 4 after the user has added additional elements to the graphics drawing. In this example, the user has created circle 500 with a checkered graphic style 318. When this element is added to the drawing, the graphics application determines that auto-layer sorting is enabled, as indicated by radio button 311. The graphics application then determines that the circle 500 has the checkered graphic style 318 applied to it. The graphics application then determines if a layer exists that corresponds to the checkers graphic style 318. In this example, no layer corresponds to the checkered graphic style 318. Accordingly, the graphics application creates a new layer, Layer 3, as shown in the layer dialog 310 as list entry 502. The graphics application then associates circle 500 with Layer 3, as indicated by list entry 504.

As described, embodiments of the invention provide an auto layer sorting feature, where drawing elements are sorted into different drawing layers based on the graphic style associated with each individual drawing element. Advantageously, when the auto layer sort tools are activated, objects created in the graphics application are automatically associated with a layer such that all objects on the layer have the same graphic style. If the user changes the properties of a given graphics style, the updated style may be applied to all objects on that layer. Thus, rather then hunting down different objects manually, the user may efficiently and conveniently manage graphic styles in a CAD drawing. Further, if the object being created has a graphic style that does not match an already existing layer, then a new layer is created and the object is placed on the new layer. Further still, a graphical user interface may allow the user to specify which graphic styles should be auto-sorted into layers, as well as override individual objects from being auto-sorted or override individual objects from being updated when the style associated with a given drawing layer is updated.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed is:

1. A method for sorting drawing objects in a computer aided design (CAD) drawing in one or more drawing layers, comprising:
   receiving user input defining a drawing object to add to the CAD drawing;
   identifying a graphic style associated with the drawing object;
   determining whether the CAD drawing includes a drawing layer that is associated with the graphic style of the drawing object; and
   upon determining the CAD drawing includes a drawing layer associated with the graphic style of the drawing object, determining that the drawing layer is accepting additional drawing objects and associating the drawing object with the drawing layer; and
   upon determining the CAD drawing does not include a drawing layer associated with the graphic style of the drawing object, creating a new drawing layer associated with the graphic style of the object and associating the drawing object with the new drawing layer.

2. The method of claim 1, further comprising:
   modifying the graphic style associated with the drawing layer; and
   applying the modified graphic style to each drawing object associated with the drawing layer.

3. The method of claim 1, further comprising:
   modifying graphic style associated with the drawing object; and
   removing the association between the drawing object and the drawing layer.

4. The method of claim 1, further comprising:
   modifying the graphic style associated with the drawing object; and
   applying the modified graphic style to each drawing object associated with the drawing layer.

5. The method of claim 1, wherein the graphic style is a color of the drawing object.

6. The method of claim 1, wherein the graphic style includes parameters that define at least one of a line-stroke weight, a line overshoot, a fill-color, a fill pattern, a stroke hardness, a stroke darkness, an object transparency, an object texture, or a color.

7. A computer-readable storage medium storing instructions that when executed by a processor cause the processor to sort drawing objects in a computer aided design (CAD) drawing into one or more drawing layers, by performing the steps of:
   receiving user input defining a drawing object to add to the CAD drawing;
   identifying a graphic style associated with the drawing object;
   determining whether the CAD drawing includes a drawing layer that is associated with the graphic style of the drawing object; and
   upon determining the CAD drawing includes a drawing layer associate with the graphic style of the drawing object, determining that the drawing layer is accepting additional drawing objects and associating the drawing object with the drawing layer; and
   upon determining the CAD drawing does not include a drawing layer associated with the graphic style of the drawing object, creating a new drawing layer associated with the graphic style of the object and associating the drawing object with the new drawing layer.

8. The computer-readable storage medium of claim 7, wherein the steps further comprise:
   modifying the graphic style associated with the drawing layer; and
   applying the modified graphic style to each drawing object associated with the drawing layer.

9. The computer-readable storage medium of claim 7, wherein the steps further comprise:
   modifying the graphic style associated with the drawing object and
   applying the modified graphic style to each drawing object associated with the drawing layer.

10. The computer-readable storage medium of claim 7, wherein the steps further comprise:
    modifying graphic style associated with the drawing object; and
    removing the association between the drawing object and the drawing layer.

11. The computer-readable storage medium of claim 7, wherein the graphic style is a color of the drawing object.

12. The computer-readable storage medium of claim 7, wherein the graphic style includes parameters that define at least one of a line-stroke weight, a line overshoot, a fill-color, a fill pattern, a stroke hardness, a stroke darkness, an object transparency, an object texture, or a color.

13. A method for sorting drawing objects in a computer aided design (CAD) drawing in one or more drawing layers, the method comprising:
    composing a drawing object to add to the CAD drawing, wherein the drawing object is associated with the graphic style; and invoking a auto-sort tool provided by a CAD application, wherein the CAD application is configured to:
  receive the drawing object to add to the CAD drawing,
  identify the graphic style associated with the drawing object,
  determine whether the CAD drawing includes a drawing layer that is associated with the graphic style of the drawing object, and
  upon determining the CAD drawing includes a drawing layer associated with the graphic style of the drawing object, determine that the drawing layer is accepting additional drawing objects and associate the drawing object with the drawing layer; and
  upon determining the CAD drawing does not include a drawing layer associated with the graphic style of the drawing object, create a new drawing layer associated with the graphic style of the object and associate the drawing object with the new drawing layer.

14. The method of claim 13, wherein the auto-sort tool provided by the CAD application is further configured to:
  receive user input modifying the graphic style associated with the drawing object; and
  apply the modified graphic style to each drawing object associated with the drawing layer.

15. The method of claim 13, wherein the auto-sort tool provided by the CAD application is further configured to:
  receive user input modifying the graphic style associated with the drawing layer; and
  apply the modified graphic style to each drawing object associated with the drawing layer.

16. The method of claim 13, wherein the auto-sort tool provided by the CAD application is further configured to:
  receive user input modifying graphic style associated with the drawing object; and
  remove the association between the drawing object and the drawing layer.

17. The method of claim 13, wherein the graphic style is a color of the drawing object.

18. The method of claim 13, wherein the graphic style includes parameters that define at least one of a line-stroke weight, a line overshoot, a fill-color, a fill pattern, a stroke hardness, a stroke darkness, an object transparency, an object texture, or a color.

* * * * *